United States Patent [19]

Carpita

[11] Patent Number: 5,355,299
[45] Date of Patent: Oct. 11, 1994

[54] CIRCUIT DEVICE FOR PREVENTING SATURATION OF THE TRANSFORMER IN A DC/AC CONVERTER HAVING A FEEDBACK-REGULATED INVERTER

[75] Inventor: Mauro Carpita, Genova, Italy

[73] Assignee: Ansaldo-Un'Azienda Finmeccanica S.P.A., Rome, Italy

[21] Appl. No.: 81,620

[22] Filed: Jun. 23, 1993

[30] Foreign Application Priority Data

Jul. 22, 1992 [IT] Italy .......................... MI 92A001776

[51] Int. Cl.$^5$ ............................................. H02M 3/24
[52] U.S. Cl. ........................................ 363/95; 363/98
[58] Field of Search ................... 363/95, 97, 98, 131, 363/132

[56] References Cited

U.S. PATENT DOCUMENTS

| | | | |
|---|---|---|---|
| 3,659,185 | 4/1972 | Gregorich | 321/2 |
| 4,124,885 | 11/1978 | Nordby | 363/98 |
| 4,532,583 | 7/1985 | Nemoto | 363/96 |
| 4,591,963 | 5/1986 | Retotar | 363/17 |
| 4,617,622 | 10/1986 | Fox | 363/98 |
| 4,903,184 | 2/1990 | Hirose | 363/37 |
| 4,969,079 | 11/1990 | Kiriyama et al. | 363/41 |
| 4,972,124 | 11/1990 | Powers | 315/219 |
| 5,012,400 | 4/1991 | Yasuda | 363/95 |
| 5,081,570 | 1/1992 | Chibani et al. | 363/17 |
| 5,111,377 | 5/1992 | Higasa et al. | 363/95 |
| 5,113,085 | 5/1992 | Schafer et al. | 307/239 |

FOREIGN PATENT DOCUMENTS

DD
237943A1 7/1986 Fed. Rep. of Germany ......... H02M 7/521

OTHER PUBLICATIONS

Carpita et al., "Power Conditioning System Using Sliding Mode Control", pp. 626-633, 1988, *PESC '88 Record*, Apr., vol. 2.

*Primary Examiner*—Steven L. Stephan
*Assistant Examiner*—Matthew Nguyen
*Attorney, Agent, or Firm*—Sheridan, Ross & McIntosh

[57] ABSTRACT

A DC/AC converter is disclosed which has an inverter coupled to a load via a transformer. A control signal generator causes the inverter to switch according to a predetermined procedure, and a feedback loop is responsive to at least one state quantity of the circuit to act on the control signal generator and modify the state quantities so as to ensure a predetermined stable pattern for the output AC voltage. To prevent the transformer from becoming saturated, a circuit device is provided which includes correcting means effective to sense in the inverter output voltage an unbalance causing the appearance of a DC component at the primary of the transformer and to apply a correction signal to the control signal generator for so modifying the switch signals as to cancel the unbalance.

1 Claim, 1 Drawing Sheet

CIRCUIT DEVICE FOR PREVENTING SATURATION OF THE TRANSFORMER IN A DC/AC CONVERTER HAVING A FEEDBACK-REGULATED INVERTER

FIELD OF THE INVENTION

This invention relates to circuitry for converting a DC voltage to a sinusoidal AC voltage, wherein a feedback-regulated switching inverter is coupled to a load through a transformer, and in particular, to a circuit device for preventing saturation of the transformer.

BACKGROUND OF THE INVENTION

In general, DC/AC converter circuits, i.e. DC to AC voltage converters, are devices operative to output a sinusoidal voltage having predetermined, but variable amplitude and frequency according to necessity. Their operation is based on the controlled switching of a DC voltage input to an inverter incorporating controlled electronic switches.

Converters have been known which are operative to supply systems wherein the load may significantly affect the converter output quantities, and which are feedback regulated to avoid altering the sinusoidal output waveform. An embodiment of a feedback regulated converter operated in the so-called sliding mode is disclosed in Patent Application No. MI92A001290 filed by this Applicant on May 25, 1992. In this prior art, the inverter output voltage and current are compared with a sinusoidal reference voltage and a sinusoidal reference current, respectively, and the result of the comparison, i.e. the error signal, is used to automatically set that sequence and those switching times for the inverter switches which are most effective to keep the output quantities at the desired values.

In many practical applications of the converters, a transformer must be used to both output a voltage with an amplitude other than that of the inverter own output voltage, usually a larger one, and to ensure galvanic isolation of the DC voltage source from the load.

In transformer-type converters which are feedback regulated by measuring output quantities from the transformer secondary, there may arise problems from saturation of the transformer core. In fact, due to asymmetric or uneven operation of the inverter—such as may be brought about by slight physical differences in the electronic switches—or to intentional or unintentional time lags in the make and break commands to the various switches, a DC voltage component may appear at the transformer primary. Since the feedback system cannot sense this component due to the measurements being taken at the secondary circuit, the DC component will result in increased magnetization current, and attendant likelihood of the core becoming saturated.

To attenuate this effect, expedients have been proposed circuit-wise for raising the DC voltage input to the inverter in a gradual fashion. However, this prior approach, while avoiding core saturation from turn-on phenomena by virtue of the core magnetization occurring therein at a slowed rate, falls short of solving the problem which is primarily tied, as mentioned, to structural asymmetries of the inverter.

SUMMARY OF THE INVENTION

It is the object of this invention to prevent saturation of the transformer in a converter of the type outlined above, with enhanced effectiveness.

This object is achieved by the provision of a circuit device as indicated and characterized, in its most comprehensive form, in claim appended to this specification.

BRIEF DESCRIPTION OF THE DRAWING

The invention can be more clearly understood from the following detailed description of two embodiments thereof, to be taken by way of example and not of limitation in conjunction with the accompanying drawing.

DETAILED DESCRIPTION OF THE INVENTION

Figure 1:
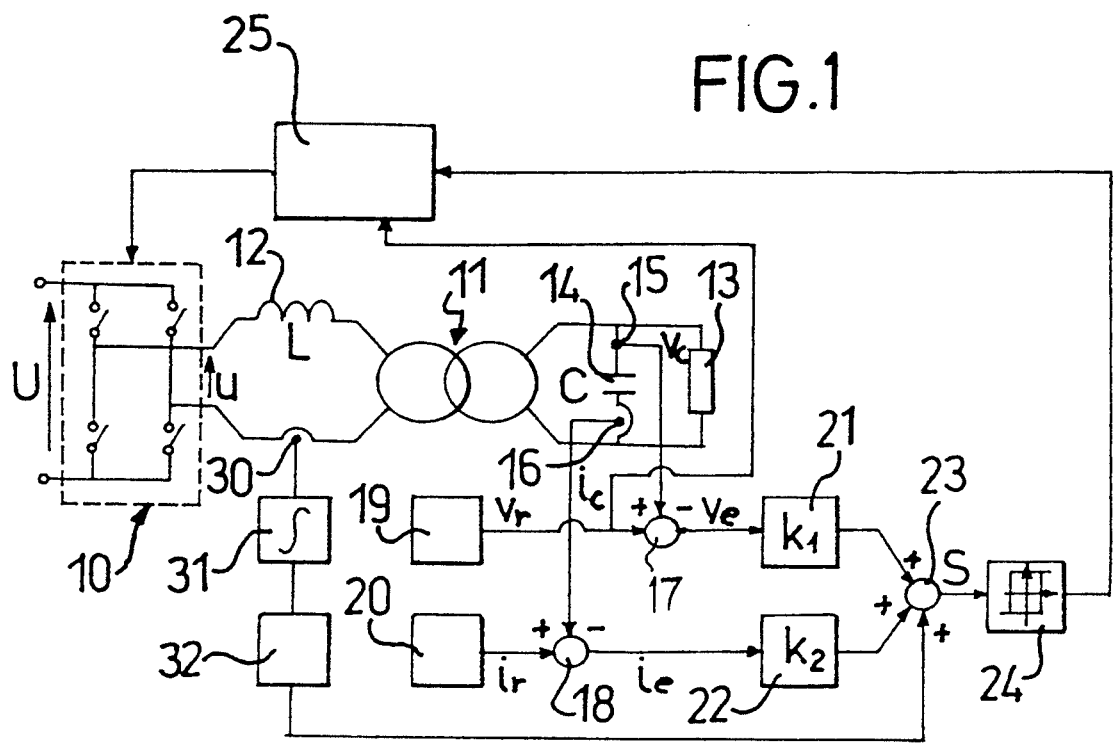
FIGS. 1 and 2 of the drawing show, substantially in block diagram form, a like converter equipped with first and second versions of an anti-saturation device according to the invention.

The converter shown in the drawing figures comprises an inverter which is controlled to switch by pulse width modulation and is feedback regulated using a sliding mode technique, similar to that described in detail in the aforementioned patent application.

In particular, with reference to FIG. 1, a single-phase inverter in a bridge configuration, generally shown at 10, is connected with its input to a DC voltage source U, not shown, and with its output to the primary of a transformer 11 via a coil 12 having an inductance L. The secondary of the transformer 11 is connected to a load 13 in parallel with a capacitor 14 having a capacitance C. The voltage $v_c$ across the capacitor 14 and the capacitor charge current $i_c$, representing the output state x of the circuit, are sensed by specially provided sensors 15, 16 and respectively compared, at a voltage comparator 17 and a circuit node 18, with a reference voltage $v_r$ and a reference current $i_r$ generated by purposely arranged sinusoidal voltage and current sources 19 and 20.

The outputs of the comparator 17 and the node 18, whereat the comparison resultant signals—i.e. the state error signals $v_e$ and $i_e$, briefly $x_e$—would appear, are respectively connected to an amplifier 21 having a gain $K_1$, and an amplifier 22 having a gain $K_2$. The outputs of the amplifiers 21, 22 are connected to a summing circuit 23 operative to combine the amplifier output signals together so as to output a signal representing a weighted mean of the state errors $s(x_e)$. The output of the summing circuit 23 is connected to the input of a hysteresis comparator 24 whose output is connected to a logic control circuit 25, in turn connected to a control input of the inverter 10 to control it to change over, that is to drive its switches to break and make. The logic circuit 25 also has an input connected to the output of the reference voltage source 19.

In operation, the output signal $s(x_e)$ from the summing circuit 23 controls the hysteresis comparator 24 to supply the logic circuit 25 with a logic signal at a first level, if $s(x_e)$ is greater than zero, and at a second level if $s(x_e)$ is smaller than zero. The logic circuit is implemented, in accordance with well-known conventional techniques, through a sequential network whereby the inverter switches are controlled in combination and succession to have the output u of the inverter satisfy the following conditions:

$u = U_{max}$ if $s(x_e) > 0$ and $v_r > 0$ $u = 0$ if $s(x_e) < 0$ and $v_r > 0$ $u = 0$ if $s(x_e) > 0$ and $v_r < 0$ $u = U_{min}$ if $s(x_e) < 0$ and $v_r < 0$ where, $U_{max}$ and $U_{min}$ are voltage values substantially equal in absolute value to the DC voltage U at the inverter 10 input and carrying a positive and negative sign, respectively. In addition, the logic circuit 25 is such as to optimize the switching sequence by also utilizing the two different states which enable a null voltage to be output.

The output voltage u from the inverter 10, as modulated in the manner just described, is filtered by the inductance of the coil 12 and the transformer primary, as well as the capacitor C on the secondary, and outputs, therefore, a voltage $v_c$ from the converter which has a substantially sinusoidal waveform and an amplitude which will depend on the transformation ratio of the transformer. The pattern of the output voltage $v_c$ is kept stable by the feedback circuit, irrespective of any variations in the load 13. However, any symmetry defects of the inverter 10 may produce unbalance in its output voltage u resulting in the appearance of a DC voltage component at the primary of the transformer 11. Since the state of the circuit is sensed at the secondary circuit, the above-described feedback action cannot compensate for said unbalance, and accordingly, the transformer core may become saturated.

In a first embodiment of the invention, shown in FIG. 1, this drawback is removed through the use of a circuit device which forms a second regulating feedback loop for the converter. Specifically, the anti-saturation circuit device comprises a current sensor 30 connected in the primary circuit of the transformer 11, an integrator 31 which outputs a proportional signal to any DC component sensed by the sensor 30, and a regulator 32 which is input that signal and applies, to the summing circuit 23, an error signal effective to correct the signal representing the weighted mean, as produced by the adder, of the state errors, thereby modifying the switch signals of the inverter 10 through the logic circuit 25. Understandably, the amplitude and sign of the error signal are such that the ultimate effect will tend to cancel out the error, that is to cancel the DC component in the primary current of the transformer.

Figure 2:
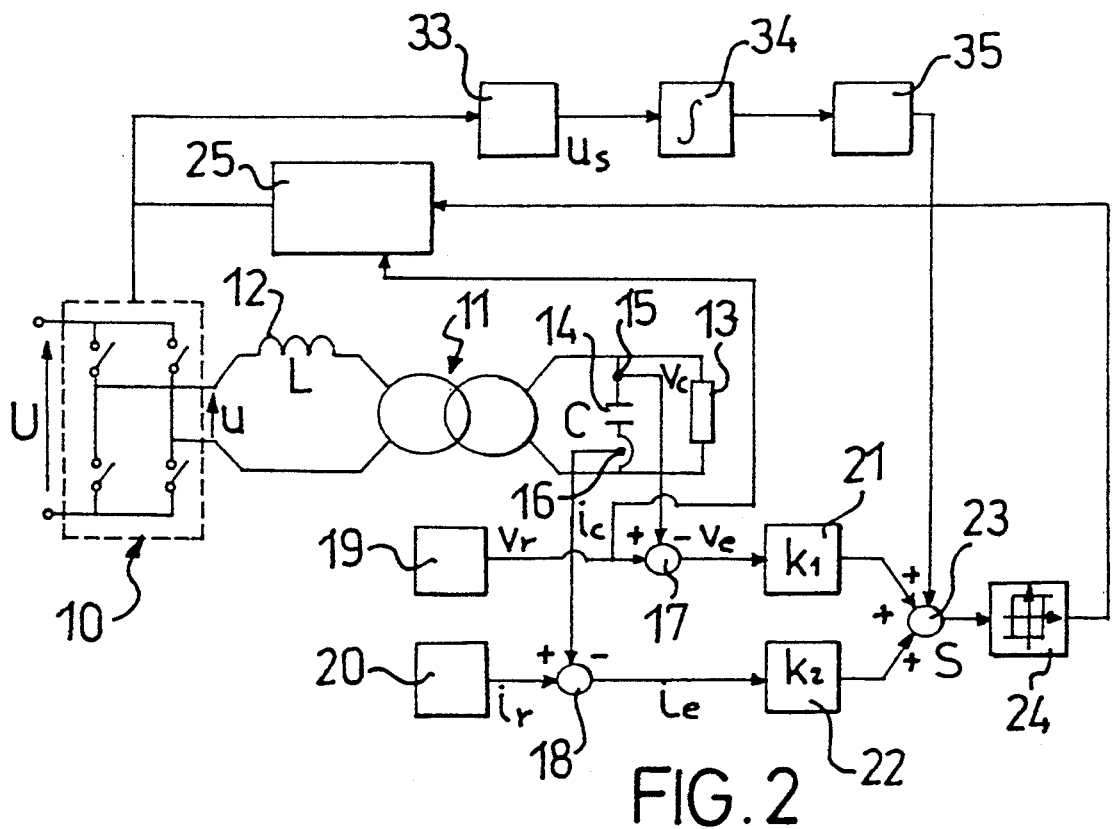

In FIG. 2, a second embodiment of the invention is shown applied to a converter which is quite similar to the converter in FIG. 1. The anti-saturation circuit device is based here on a processing circuit 33 which simulates the structure and operation of the inverter 10. It is input the inverter 10 switch control signals generated by the logic control circuit 25 and computes a quantity $u_s$ corresponding to the output voltage u from the inverter. This quantity $u_s$ is applied to an integrator 34 which will output a signal correlated to the DC current component at the tranformer primary; in practice, a proportional signal thereto to be obtained by calculating the mean value of the quantity $u_s$. This signal is then applied to the summing circuit 23 via a regulator 35, at an amplitude and with a sign such as to compensate for the unbalance that originated the DC component.

Notice that this feedback regulation effect is indirect, in this instance. In fact, the simulation on the processing circuit 33 cannot take into account the structural and functional asymmetries of the inverter 10 directly. Due to the main feedback loop, these reflect, however, on the form of the modulated voltage that appears at the inverter output and, therefore, on the control signals generated by the logic circuit 25 to switch the inverter. Thus, the information about the inverter unbalance will reach the processing circuit 33 over those control signals. This explains why the anti-saturation device compensates for the symmetry error with some approximation, but does not represent a problem because the regulating loop is very slow (3-4 periods) and only aimed at preventing the magnetization current from "drifting" with time and bringing the transformer to saturation.

While only two embodiments of the invention have been described and illustrated, it is understood that many changes and modifications may be made thereunto within the scope of the same inventive concept. Thus, for example, the anti-saturation device of the invention may be readily adapted for operation with converters having multi-phase inverters, rather than single-phase like the one described, provided that such converters incorporate a feedback regulation system.

I claim:

1. An anti-saturation device for a transformer connected with its primary winding to an output of an inverter of a circuit for converting a DC voltage to a sinusoidal AC voltage, said circuit including control signal generating means connected to the inverter for controlling it to switch based on switching signals according to a predetermined switching procedure, and feedback means responsive to at least one state quantity of the circuit by so acting on the control signal generating means as to modify the state quantities and ensure a predetermined stable pattern for the sinusoidal AC voltage, wherein said anti-saturation device comprises correcting means effective to sense a sensed quantity indicative of a DC voltage component at the primary winding of the transformer, and to apply a correction signal to the control signal generating means for modifying the switching signals such as to compensate for said DC voltage component, said correcting means including processing means connected to the control signal generating means, operative to simulate the inverter operation in order to compute a computed quantity corresponding to an output voltage of the inverter, an integrator for generating an output quantity correlated to a DC component of said computed quantity, and means for obtaining said correction signal from said integrator output quantity.

* * * * *